(12) United States Patent
Xu

(10) Patent No.: US 12,049,949 B2
(45) Date of Patent: Jul. 30, 2024

(54) THREE-ROW ROLLER SLEWING BEARING-GEARBOX INTEGRATED STRUCTURE

(71) Applicant: Zongyou Xu, Chongqing (CN)

(72) Inventor: Zongyou Xu, Chongqing (CN)

( * ) Notice: Subject to any disclaimer, the term of this patent is extended or adjusted under 35 U.S.C. 154(b) by 0 days.

(21) Appl. No.: 18/330,986

(22) Filed: Jun. 7, 2023

(65) Prior Publication Data
US 2023/0313876 A1 Oct. 5, 2023

(30) Foreign Application Priority Data
May 12, 2023 (CN) ......................... 202310536539.8

(51) Int. Cl.
| | | |
|---|---|---|
| F16C 19/38 | (2006.01) | |
| F03D 15/00 | (2016.01) | |
| F16C 19/52 | (2006.01) | |
| F16H 1/28 | (2006.01) | |
| F16H 57/02 | (2012.01) | |
| F16H 57/08 | (2006.01) | |

(52) U.S. Cl.
CPC ............. *F16H 57/02* (2013.01); *F03D 15/00* (2016.05); *F16C 19/522* (2013.01); *F16H 1/28* (2013.01); *F16H 57/08* (2013.01); *F05D 2260/40311* (2013.01); *F16C 19/381* (2013.01); *F16C 2300/14* (2013.01); *F16C 2360/31* (2013.01); *F16H 2057/02078* (2013.01); *F16H 2057/085* (2013.01)

(58) Field of Classification Search
CPC ..................... F16H 57/02; F16H 57/08; F16H 2057/02078; F16H 2057/085; F16C 19/522; F16C 2300/14; F16C 19/381; F08B 2260/40311; F03D 15/101
See application file for complete search history.

(56) References Cited

U.S. PATENT DOCUMENTS

| | | | | |
|---|---|---|---|---|
| 1,776,647 | A * | 9/1930 | Zubler | F16C 19/381 384/455 |
| 6,872,049 | B2 * | 3/2005 | Christensen | F03D 80/70 415/908 |
| 7,011,598 | B2 * | 3/2006 | Flamang | F03D 15/10 475/331 |

(Continued)

FOREIGN PATENT DOCUMENTS

| | | | | |
|---|---|---|---|---|
| CN | 105822723 A | | 8/2016 | |
| CN | 107508514 A | * | 12/2017 | ................ H02P 9/06 |

(Continued)

*Primary Examiner* — Sherry L Estremsky

(57) ABSTRACT

A three-row roller slewing bearing-gearbox integrated structure, including a three-row roller slewing bearing and a gearbox. The three-row roller slewing bearing includes an outer ring, a first inner ring, and a second inner ring. The first inner ring and the second inner ring are connected to each other. The outer ring is sleevedly provided outside the first inner ring and the second inner ring. The gearbox includes a housing, an inner ring gear, and a first-stage planet carrier. The inner ring gear is fixedly connected to the housing. The first-stage planet carrier is provided in the housing. The first-stage planet carrier is rotatable relative to the housing. The outer ring is connected to the inner ring gear, and the first inner ring is connected to the first-stage planet carrier.

9 Claims, 3 Drawing Sheets

(56) References Cited

U.S. PATENT DOCUMENTS

| | | | | |
|---|---|---|---|---|
| 7,703,985 | B2 * | 4/2010 | Olsen | F03D 80/70 |
| | | | | 384/510 |
| 8,222,759 | B2 * | 7/2012 | Loeschner | F16H 57/021 |
| | | | | 290/55 |
| 9,388,796 | B2 * | 7/2016 | Frank | F16H 57/08 |
| 9,422,923 | B2 * | 8/2016 | Frank | F03D 80/70 |
| 9,739,263 | B2 * | 8/2017 | Frank | F03D 7/0204 |
| 11,619,211 | B2 * | 4/2023 | Madden | F16C 33/64 |
| | | | | 290/55 |

FOREIGN PATENT DOCUMENTS

| | | | | | |
|---|---|---|---|---|---|
| CN | 108869642 | A | | 11/2018 | |
| CN | 210551030 | U | | 5/2020 | |
| CN | 211852684 | U | * | 11/2020 | |
| CN | 115789214 | A | * | 3/2023 | |
| DE | 10318945 | B3 | * | 10/2004 | F03D 15/00 |
| DE | 202010009404 | U1 | * | 12/2010 | F16C 19/38 |
| DE | 102015102867 | A1 | * | 9/2016 | |
| EP | 1544504 | A2 | * | 6/2005 | F03D 15/00 |
| EP | 1677005 | A1 | * | 7/2006 | F03D 15/00 |
| JP | 2518097 | Y2 | * | 11/1996 | |
| WO | WO-2011089036 | A1 | * | 7/2011 | F03D 15/00 |

\* cited by examiner

THREE-ROW ROLLER SLEWING BEARING-GEARBOX INTEGRATED STRUCTURE

CROSS-REFERENCE TO RELATED APPLICATIONS

This application claims the benefit of priority from Chinese Patent Application No. 202310536539.8, filed on May 12, 2023. The content of the aforementioned application, including any intervening amendments thereto, is incorporated herein by reference in its entirety.

TECHNICAL FIELD

This application relates to wind turbine gearboxes, and more particularly to a three-row roller slewing bearing-gearbox integrated structure.

BACKGROUND

Low-carbon environmental protection has become a mainstream trend of future global development. The wind power industry realizes the low-carbon environmental protection from the energy supply side. Accelerating and realizing wind energy substitution and promoting the optimization of energy consumption structure are the development needs of the entire energy industry and social economy, and are also the development goal of the wind power industry itself. The connection to grid at an equal price is an important part of the wind power industry development. Reducing the price of the kilowatt per unit of the whole machine is one of the most direct ways to achieve the connection to grid at the equal price. In the cost of high-power units, the cost of gearbox and main bearing system accounts for more than 50% of the cost of the whole machine. Reducing the cost of the main bearing system and gearbox is conducive to reducing the cost of the kilowatt per unit of the whole machine and enhancing the market competitiveness of the machine. The connection between the spindle assembly and the gearbox in the traditional high-power wind turbines is displayed in FIG. 3. Specifically, the spindle 1 is supported by two bearings 2, and the two bearings 2 are supported by two bearing seats 3, respectively (optionally, the two bearings 2 can also be supported by an integral bearing seat). Then the spindle 1 is connected to the gearbox 4 via a locking plate or an end flange, resulting in large size, heavy weight, and high cost.

SUMMARY

An object of this application is to provide a three-row roller slewing bearing-gearbox integrated structure, which solves the problem of large size, heavy weight, and high cost of the traditional high-power wind power machine.

Technical solutions of this application are described as follows.

In a first aspect, this application provides a three-row roller slewing bearing-gearbox integrated structure, including:
 a three-row roller slewing bearing; and
 a gearbox;
 wherein the three-row roller slewing bearing includes an outer ring, a first inner ring, and a second inner ring; the first inner ring is connected to the second inner ring; and the outer ring is sleevedly provided outside the first inner ring and the second inner ring; and
 the gearbox includes a housing, an inner ring gear, and a first-stage planet carrier; the inner ring gear is fixedly connected to the housing; the first-stage planet carrier is provided in the housing; the first-stage planet carrier is rotatable relative to the housing; the outer ring is connected to the inner ring gear; and the first inner ring is connected to the first-stage planet carrier.

In an embodiment, the first inner ring is boltedly connected to the second inner ring.

In an embodiment, the first inner ring is connected to the first-stage planet carrier through a fastener.

In an embodiment, the outer ring is connected to the inner ring gear through a fastener.

In an embodiment, a radial clearance of the three-row roller slewing bearing is equal to or less than 0 mm.

In a second aspect, this application provides a three-row roller slewing bearing-gearbox integrated structure, including:
 a three-row roller slewing bearing; and
 a gearbox;
 wherein the three-row roller slewing bearing includes an outer ring, a first inner ring, and a second inner ring; the first inner ring is connected to the second inner ring; and the outer ring is sleevedly provided outside the first inner ring and the second inner ring; and
 the gearbox includes a housing, an inner ring gear, and a first-stage planet carrier; the inner ring gear is provided in the housing; the inner ring gear is rotatable relative to the housing; the first-stage planet carrier is fixedly connected with the housing; the outer ring is connected to the first-stage planet carrier; and the first inner ring is connected to the inner ring gear.

In an embodiment, the first inner ring is boltedly connected to the second inner ring.

In an embodiment, the first-stage planet carrier is connected to the outer ring through a fastener.

In an embodiment, the first inner ring is connected to the inner ring gear through a fastener.

In an embodiment, a radial clearance of the three-row roller slewing bearing is equal to or less than 0 mm.

Regarding the three-row roller slewing bearing-gearbox integrated structure provided herein, the three-row roller slewing bearing is directly connected to a first-stage planet carrier of the gearbox; the inner ring gear of the gearbox is directly or indirectly connected with an outer ring of the three-row roller slewing bearing through a flange; and the first-stage planet carrier of the gearbox is connected to the first inner ring and the outer ring. The three-row roller slewing bearing has an excellent rigidity, and the relative deformation of the inner and outer rings is extremely slight, which can ensure a good load transfer under the rigid connection between the gearbox and the three-row roller slewing bearing, and do not require special design for the gearbox.

Compared with the traditional structures, the integrated structure designed herein is free of a main shaft and a split or integral bearing seat, such that the size of the drive system is reduced by at least 2 m, and the base structure is more simplified. The integrated structure is boltedly connected to the base, allowing for simple and reliable assembly. Moreover, compared with the traditional design, the planet carrier of the gearbox eliminates the front and rear end bearings. The optimized integrated structure is conducive to reducing the procurement, maintenance, and production costs of wind turbines.

BRIEF DESCRIPTION OF THE DRAWINGS

In order to illustrate the technical solutions in the embodiments of the present disclosure or in the prior art more clearly, the drawings required in the description of the embodiments or the prior art will be briefly described below. Obviously, presented in the drawings are merely some embodiments of the present disclosure, which are not intended to limit the disclosure. For those skilled in the art, other drawings may also be obtained according to the drawings provided herein without paying creative efforts.

In the figures: 100—three-row roller slewing bearing-gearbox integrated structure; 1-3—three-row roller slewing bearing; 1.1—outer ring; 1.2—first inner ring; 1.3—second inner ring; 2—gearbox; 2.1—inner ring gear; 2.2—first-stage planet carrier; 2.3—housing; 3—first fastener; 4—second fastener; and 5—bolt.

DETAILED DESCRIPTION OF EMBODIMENTS

The present disclosure will be further described in detail below with reference to the embodiments and accompanying drawings. The same or similar reference signs indicate the same or similar element or elements having the same or similar function throughout the drawings. The embodiments described below in conjunction with the accompanying drawings are merely illustrative of the present disclosure, and not intended to limit the scope of the disclosure.

A three-row roller slewing bearing-gearbox integrated structure 100 provided in this disclosure is used to form a wind turbine in combination with a rotor (i.e., a combination of blades and hub) and a generator for wind power generation. The rotor is configured to drive a second inner ring 1.3 of a three-row roller slewing bearing 1 to rotate, and transmit the rotation speed to the gearbox 2 through the first inner ring 1.2. After the rotation speed is increased by the gearbox 2, a higher rotation speed is output to the generator to drive the generator to generate electricity.

Two different embodiments of the three-row roller slewing bearing-gearbox integrated structure 100 are provided in this disclosure. Specifically, the two embodiments vary in the structure of the gearbox 2, and the connection between the gearbox 2 and the three-row roller slewing bearing 1.

Embodiment 1

Figure 1:
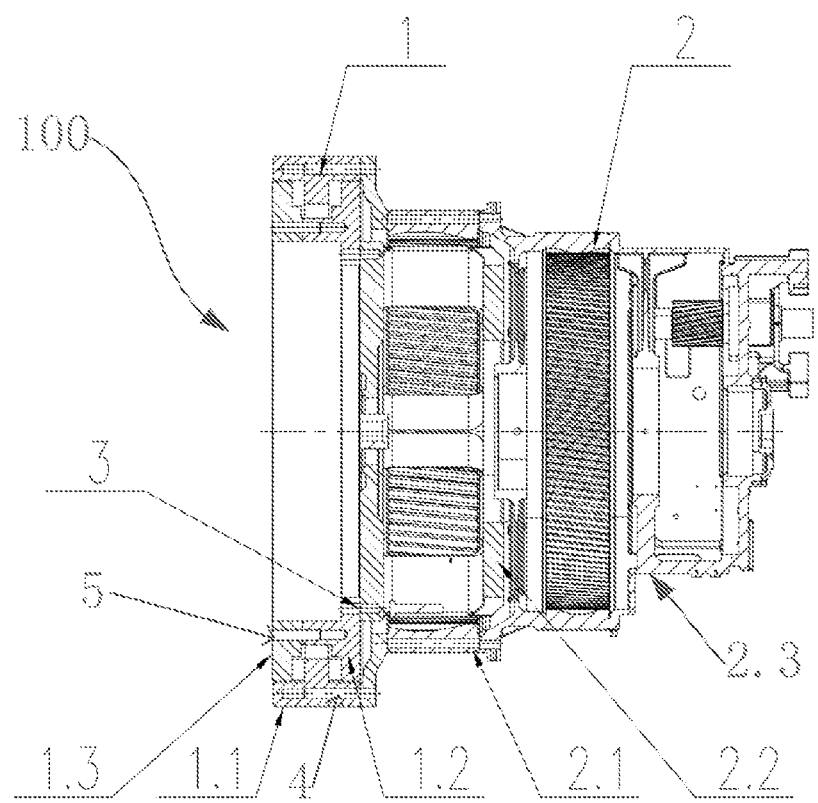
FIG. 1 schematically shows a structure of a three-row roller slewing bearing-gearbox integrated structure according to Embodiment 1 of the present disclosure.

Referring to FIG. 1, the three-row roller slewing bearing-gearbox integrated structure 100 includes a three-row roller slewing bearing 1 and a gearbox 2. The three-row roller slewing bearing 1 includes an outer ring 1.1, a first inner ring 1.2, and a second inner ring 1.3. The first inner ring 1.2 is connected to the second inner ring 1.3. The outer ring 1.1 is sleevedly provided outside the first inner ring 1.2 and the second inner ring 1.3. The gearbox 2 includes a housing 2.3, an inner ring gear 2.1, and a first-stage planet carrier 2.2. The inner ring gear 2.1 is fixedly connected to the housing 2.3. The first-stage planet carrier 2.2 is provided in the housing 2.3. The first-stage planet carrier 2.2 is rotatable relative to the housing 2.3. The outer ring 1.1 of the three-row roller slewing bearing 1 is connected to the inner ring gear 2.1 of the gearbox 2. The first inner ring 1.2 of the three-row roller slewing bearing 1 is connected to the first-stage planet carrier 2.2 of the gearbox 2.

In this embodiment, the three-row roller slewing bearing 1 is directly connected to the gearbox 2. The three-row roller slewing bearing 1 has an excellent better rigidity, and the relative deformation of the first inner ring 1.2, the second inner ring 1.3, and the outer ring 1.1 is extremely slight, which can ensure a good load transfer under the rigid connection between the gearbox 2 and the three-row roller slewing bearing 1. Thus, there is no need to connect with the gearbox 2 through the main shaft as in the prior art, and then there is no need for providing the split or integral bearing and bearing seat for supporting the main shaft. In this disclosure, the three-row roller slewing bearing 1 is directly connected to the gearbox 2, thereby removing the structure of the main shaft and the bearing seat, so that the integrated structure has a less and simpler structure, a smaller size, a lower cost, a smaller weight, and a smaller footprint.

In this embodiment, the first inner ring 1.2 is connected to the second inner ring 1.3 by a bolt 5.

In this embodiment, a wind wheel is connected to the second inner ring 1.3 and the first inner ring 1.2. Specifically, the wind wheel rotates through the second inner ring 1.3 and the first inner ring 1.2 of the three-row roller slewing bearing 1, and transmits the rotation speed to the first-stage planet carrier 2.2 through the first inner ring 1.2. After the rotation speed is increased by the gearbox 2, the output end of the gearbox 2 outputs the high rotation speed to the generator to drive the generator to generate electricity.

Specifically, the wind wheel is connected to the second inner ring 1.3 and the first inner ring 1.2 of the three-row roller slewing bearing 1. The wind wheel drives the second inner ring 1.3 and the first inner ring 1.2 to rotate at the same time, and the first inner ring 1.2 is connected to the first-stage planet carrier 2.2 of the gearbox 2 through a first fastener 3, driving the first-stage planet carrier 2.2 of the gearbox 2 to rotate. The energy and rotation speed are transmitted to the second-stage planet carrier through the sun wheel of the gearbox 2. The gearbox 2 can be a multi-stage planet transmission or a combination of the planet transmission and the parallel stage transmission. Finally, the energy and rotation speed are transferred to the generator via the last-stage sun wheel or the parallel axis.

In this embodiment, the first inner ring 1.2 is connected to the first-stage planet carrier 2.2 of the gearbox 2 through the first fastener 3.

In this embodiment, the outer ring 1.1 is connected to the inner ring gear 2.1 of the gearbox 2 through a second fastener 4.

In this embodiment, a radial clearance of the three-row roller slewing bearing 1 is equal to or less than 0 mm.

Embodiment 2

Figure 2:
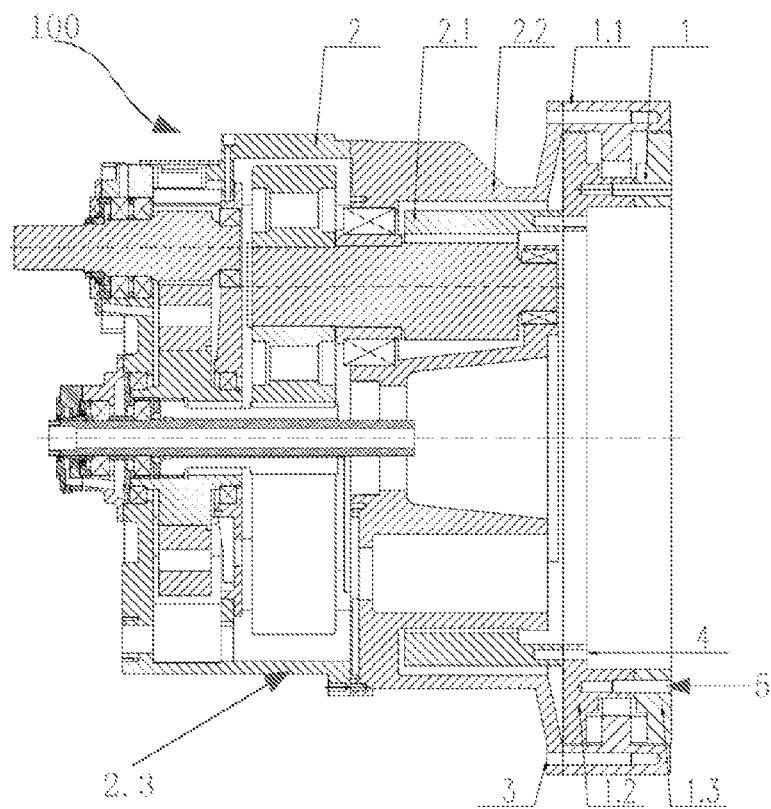
FIG. 2 schematically shows a structure of a three-row roller slewing bearing-gearbox integrated structure according to Embodiment 2 of the present disclosure.
Figure 3:
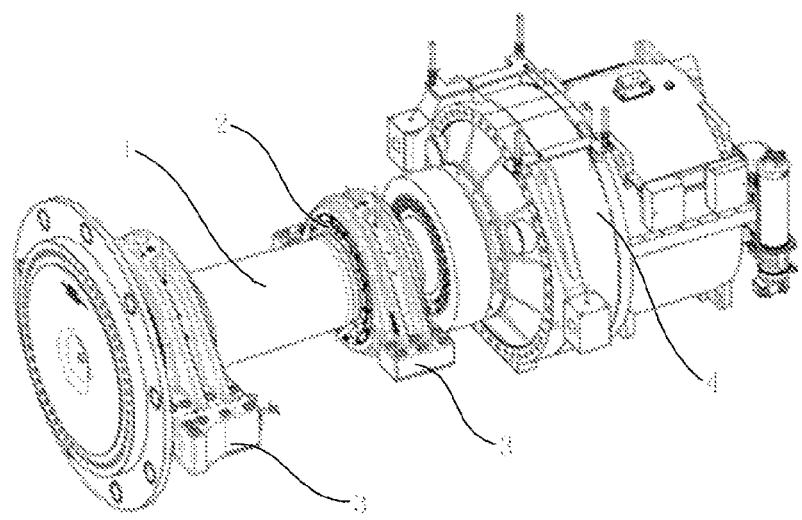
FIG. 3 schematically shows connection between a spindle assembly and a gearbox in a traditional wind turbine.

Referring to FIG. 2, the three-row roller slewing bearing-gearbox integrated structure 100 includes a three-row roller slewing bearing 1 and a gearbox 2. The three-row roller slewing bearing 1 includes an outer ring 1.1, a first inner ring 1.2, and a second inner ring 1.3. The first inner ring 1.2 is connected to the second inner ring 1.3. The outer ring 1.1 is sleevedly provided outside the first inner ring 1.2 and the second inner ring 1.3. The gearbox 2 includes a housing 2.3, an inner ring gear 2.1, and a first-stage planet carrier 2.2. The inner ring gear 2.1 is provided in the housing 2.3. The inner ring gear 2.1 can rotate relative to the housing 2.3. The first-stage planet carrier 2.2 is fixedly connected to the housing 2.3. The outer ring 1.1 of the three-row roller slewing bearing 1 is connected to the first-stage planet carrier 2.2 of the gearbox 2. The first inner ring 1.2 of the three-row roller slewing bearing 1 is connected to the inner ring gear 2.1 of the gearbox 2.

In this embodiment, the three-row roller slewing bearing 1 is directly connected to the gearbox 2. The three-row roller slewing bearing 1 has an excellent rigidity, and the relative deformation of the first inner ring 1.2, the second inner ring 1.3, and the outer ring 1.1 is extremely slight, which can ensure a good load transfer under the rigid connection of the gearbox 2 and the three-row roller slewing bearing 1. Thus, there is no need to connect with the gearbox 2 through the main shaft as in the prior art, and then there is no need for providing the split or integral bearing and bearing seat for supporting the main shaft. In this disclosure, the three-row roller slewing bearing 1 is directly connected to the gearbox 2, thereby removing the structure of the main shaft and the bearing seat, so that the integrated structure has a less and simpler structure, a smaller size, a lower cost, a smaller weight, and a smaller footprint.

In this embodiment, the first inner ring 1.2 is connected to the second inner ring 1.3 by a bolt 5.

In this embodiment, the first-stage planet carrier 2.2 of the gearbox 2 is connected to the outer ring 1.1 by a first fastener 3.

In this embodiment, the first inner ring 1.2 is connected to the inner ring gear 2.1 through a second fastener 4. Specifically, the wind wheel drives the second inner ring 1.3 and the first inner ring 1.2 to rotate and transmits the rotation speed to the inner ring gear 2.1 through the first inner ring 1.2. After the gearbox 2 increases the rotation speed, the output end of the gearbox 2 outputs the high rotation speed to the generator to drive the generator to generate electricity.

In this embodiment, the first-stage planet carrier 2.2 of the gearbox 2 is connected to the outer ring 1.1 through the first fastener 3. The first inner ring 1.2 of the three-row roller slewing bearing 1 is connected to the inner ring gear 2.1 of the gearbox 2 through the second fastener 4. The wind wheel drives the first inner ring 1.2 and the second inner ring 1.3 to rotate at the same time. The first inner ring 1.2 and the second inner ring 1.3 drive the inner ring gear 2.1 to rotate, thereby transmitting the energy and rotation speed to the second-stage planet carrier through the sun wheel of the gearbox 2. The gearbox 2 can be a multi-stage planet transmission or a combination of the planet transmission and the parallel stage transmission. Finally, the energy and rotation speed are transferred to the generator via the last-stage sun wheel or the parallel axis. The overall size of the integrated structure is further reduced, and the weight and cost are further optimized.

In this embodiment, a radial clearance of the three-row roller slewing bearing is equal to or less than 0 mm.

The three-row roller slewing bearing-gearbox integrated structure 100 provided is directly connected to the three-row roller slewing bearing 1 through the first-stage planet carrier 2.2 of the gearbox 2, and the external bolt hole of the three-row roller slewing bearing 1 is connected to the base after integration, which is simple and reliable. The three-row roller slewing bearing 1 and the gearbox 2 share a lubrication system. The three-row roller slewing bearing 1 has an excellent structural rigidity, and the relative deformation of the inner and outer ring is extremely slight, which can ensure a good load transfer under the rigid connection between the gearbox 2 and the three-row roller slewing bearing 1, and do not require special design for the gearbox 2. Compared with the traditional structures, the integrated structure designed herein is free of a main shaft and a split or integral bearing seat, such that the size of the drive system is reduced by at least 2 m and the base structure is more simplified. The integrated structure is boltedly connected to the base, allowing for simple and reliable assembly. Moreover, compared with the traditional structure, the first-stage planet carrier 2.2 of the gearbox 2 eliminates the front and rear end bearings. The fewer parts of the transmission system of the wind power equipment, and the fewer the failure points, allowing for simple assembly and higher efficiency. This integrated structure is free of the main shaft and the split or integral bearing seat, thereby greatly reducing system weight and structural size, and reducing structural cost. Moreover, the three-row roller slewing bearing 1 and the gearbox 2 are integrated, sharing a lubrication system, improving the reliability of three-row roller slewing bearing 1 and reducing maintenance costs.

Described above are merely preferred embodiments of the disclosure, which are not intended to limit the disclosure. It should be understood that any modifications and replacements made by those skilled in the art without departing from the spirit of the disclosure should fall within the scope of the disclosure defined by the present claims.

What is claimed is:

1. A three-row roller slewing bearing-gearbox integrated structure, comprising:
   a three-row roller slewing bearing; and
   a gearbox;
   wherein the three-row roller slewing bearing comprises an outer ring, a first inner ring, and a second inner ring; the first inner ring is connected to the second inner ring; and the outer ring is sleevedly provided outside the first inner ring and the second inner ring;
   the gearbox comprises a housing, an inner ring gear, and a first-stage planet carrier; the inner ring gear is fixedly connected to the housing; the first-stage planet carrier is provided in the housing; the first-stage planet carrier is rotatable relative to the housing; the outer ring is connected to the inner ring gear; and the first inner ring is connected to the first-stage planet carrier;
   the outer ring is configured to completely cover the first inner ring and the second inner ring along an axial direction of the outer ring; and the first inner ring is closer to the first-stage planet carrier with respect to the second inner ring.

2. The three-row roller slewing bearing-gearbox integrated structure of claim 1, wherein the first inner ring is boltedly connected to the second inner ring.

3. The three-row roller slewing bearing-gearbox integrated structure of claim 1, wherein the first inner ring is connected to the first-stage planet carrier through a fastener.

4. The three-row roller slewing bearing-gearbox integrated structure of claim 1, wherein the outer ring is connected to the inner ring gear through a fastener.

5. The three-row roller slewing bearing-gearbox integrated structure of claim 1, wherein a radial clearance of the three-row roller slewing bearing is equal to or less than 0 mm.

6. A three-row roller slewing bearing-gearbox integrated structure, comprising:
   a three-row roller slewing bearing; and
   a gearbox;
   wherein the three-row roller slewing bearing comprises an outer ring, a first inner ring, and a second inner ring; the first inner ring is connected to the second inner ring; and the outer ring is sleevedly provided outside the first inner ring and the second inner ring;
   the gearbox comprises a housing, an inner ring gear, and a first-stage planet carrier; the inner ring gear is provided in the housing; the inner ring gear is rotatable relative to the housing; the first-stage planet carrier is fixedly connected with the housing; the outer ring is connected to the first-stage planet carrier; and the first inner ring is connected to the inner ring gear;

the first-stage planet carrier is directly connected to the outer ring through a fastener; the outer ring is configured to completely cover the first inner ring and the second inner ring along an axial direction of the outer ring; and the first inner ring is closer to the inner ring gear with respect to the second inner ring.

7. The three-row roller slewing bearing-gearbox integrated structure of claim 6, wherein the first inner ring is boltedly connected to the second inner ring.

8. The three-row roller slewing bearing-gearbox integrated structure of claim 6, wherein the first inner ring is connected to the inner ring gear through a fastener.

9. The three-row roller slewing bearing-gearbox integrated structure of claim 6, wherein a radial clearance of the three-row roller slewing bearing is equal to or less than 0 mm.

* * * * *